United States Patent [19]

Voll et al.

[11] Patent Number: 4,755,358
[45] Date of Patent: Jul. 5, 1988

[54] FLUIDIZED BED APPARATUS FOR THE TREATMENT OF FLUIDIZED CARBON BLACK WITH GASES

[75] Inventors: Manfred Voll, Erlensee; Richard Engel, Waldorf, both of Fed. Rep. of Germany

[73] Assignee: Degussa Aktiengesellschaft, Frankfurt, Fed. Rep. of Germany

[21] Appl. No.: 818,590

[22] Filed: Jan. 14, 1986

Related U.S. Application Data

[62] Division of Ser. No. 747,609, Jun. 21, 1985, Pat. No. 4,647,444.

[30] Foreign Application Priority Data

Jun. 27, 1984 [DE] Fed. Rep. of Germany ....... 3423580

[51] Int. Cl.⁴ .............................. B01J 8/18; C09C 1/48
[52] U.S. Cl. .................... 422/106; 34/57 A; 73/293; 201/31; 422/111; 422/141; 422/143; 422/150; 422/147; 423/460
[58] Field of Search ................. 201/31; 422/141, 143, 422/105, 106, 111, 150–158; 34/57 A, 57 B, 57 E; 423/460; 73/293 R

[56] References Cited

U.S. PATENT DOCUMENTS

| | | | |
|---|---|---|---|
| 2,445,327 | 7/1948 | Keith | 201/31 |
| 2,761,769 | 9/1956 | Elder | 422/143 |
| 2,864,674 | 12/1958 | King | 422/150 |
| 3,251,337 | 5/1966 | Latta et al. | 34/57 E |
| 3,527,575 | 9/1970 | Thompson | 422/143 |
| 4,080,927 | 3/1978 | Brown | 34/57 E |
| 4,423,006 | 12/1983 | Vickers | 422/106 |
| 4,468,567 | 8/1984 | Sasano et al. | 73/293 |
| 4,518,750 | 5/1985 | Govoni et al. | 422/143 |

FOREIGN PATENT DOCUMENTS 2036326 10/1978 United Kingdom ................. 73/293

Primary Examiner—Michael S. Marcus
Attorney, Agent, or Firm—Beveridge, DeGrandi & Weilacher

[57] ABSTRACT

Method for the treatment of fluidized carbon black with gases in a fluidized bed, wherein the carbon black and the treatment gases are conveyed for introduction in an unique operating procedure into the treating region in a countercurrent stream manner. The mass streams of the carbon black and the treating gases are held constant and the mass streams of the starting carbon black or the treated carbon black is regulated with the help of an optical electrical level sensor so that the height of the fluidized bed is held on a predetermined level. An apparatus is shown for the carrying out of the fluidized bed countercurrent process which has a novel carbon black product delivery system and is provided with a optical electrical level sensor means for controlling the level of the fluidized bed. The sensor comprises a hair pin shaped lighting circuit composed of two legs or rods separated by a gap. A light source impinges on the end of one of the said legs and the other leg is oriented to an electrical signal generating light sensor.

1 Claim, 2 Drawing Sheets

FLUIDIZED BED APPARATUS FOR THE TREATMENT OF FLUIDIZED CARBON BLACK WITH GASES

This is a division of application Ser. No. 747,609 filed June 21, 1985, now U.S. Pat. No. 4,647,444.

The invention relates to a method for the treatment of fluidized carbon blacks in a fluidized bed with gases, preferably at elevated temperature, an apparatus for the carrying out of the process and a fluidized bed level sensing device which is arranged in the apparatus to provide for the indication of the predetermined level of a fluidized bed.

Carbon blacks are frequenty subjected to an after-treatment for various purposes, whether it be for the purpose of imparting specific physical property and characteristic changes, or to remove impurities therefrom or to purposefully decompose the carbon black. Accordingly, it is known that carbon blacks may be treated for the purpose of, for example, to improve their wettability through the use of binder materials, by subjecting them to an oxidative after treatment with fluidized or gaseous reactants whereby the non-polar carbon black surface area is at least partially converted into a polar surface area.

Depending upon the method by which carbon black is prepared and the particle size, carbon blacks may have polycyclic hydrocarbons, absorbed on the surfaces thereof which can be extracted with solvent substances in a quantitative manner. A relatively high content of these extractable materials can cause problems with many applications of the carbon black so that there arises the need to reduce the content of the extractable ingredients of the carbon black prior to use. This can, for example, be carried out according to DE-OS No. 31 18 907 through a treatment with hot air and/or steam.

If it is desired to raise the inner surface area of the carbon black, then one can treat the carbon black at higher temperature with gases capable of reaction such as oxygen, steam or carbon dioxide whereby it is possible with purposeful decomposition to obtain an increase in the electrical conductivity. A suitable procedure is described in the German patent application No. P 34 11 182.4 (as yet unpublished).

For the after treatment with gaseous treating materials, in general, the so-called fluidized bed procedures have become particularly advantageous because the finely divided powdery form of the starting materials is maintained throughout and the fluidized bed procedure ensures an optimal material exchange.

Accordingly, there is, for example, described in the British Pat. No. 895,990 a method for the oxidation of carbon black wherein the initial starting material is converted in a mixture with nitrogen oxide and air in a cocurrent stream in a reaction zone. A disadvantage of this procedural method arises, however, in that there is a danger that the carbon black will overheat which can lead to ignition and smoldering. This is caused by the fact that fresh carbon black capable of reaction comes into contact with the fresh oxidative substance. A further disadvantage arises because of the fact that at the end of the reaction zone, the essentially reacted carbon black comes into contact only with an atmosphere in which the oxidative material is essentially exhausted. Therefore, as a result of that, over the course of the reaction zone, there is a gradient in activity which at the beginning of the zone is too high and which at the end is too low.

It would therefore have appeared more efficient to operate in a countercurrent system, because the fresh carbon black would come into contact with only a diluted gas and the at least partially converted or reacted carbon black then comes into contact with fresh gaseous mixture capable of reaction. Therefore, the reaction should follow a more uniform pattern over the length of the reaction zone.

In spite of this expected advantage, however, the treatment of carbon black in a countercurrent manner in a fluidized bed in actual practice has not yet become feasible because there was no suitable level control or regulation available which was appropriate for utilization particularly at the high temperatures which are utilized in carbon black fluidized beds. Thus, there was missing an indispensable prerequisite to the successful operation of a fluidized bed in a countercurrent manner. Countercurrent stream operation requires that the carbon black be introduced from above and removed from below while the treating gas must always flow from beneath in an upwardly direction towards the upper part the zone in order for the fluidized bed to be properly maintained. Accordingly, when such an apparatus is to run, whether at excess capacity or partially empty, the reaction zone must always be uniformly filled and therefore measurement and regulation of the loading capacity of the fluidized bed is a necesssary essential. These measurements are very difficult with fluidized carbon black and are difficult to obtain because firstly, the density of the fluidized bed is very low at 10 to 20 grams per liter, and secondly, most of the carbon black after treatment methods utilize higher temperature and there were no suitable measuring means available that would operate satisfactorily under those conditions.

The demonstrated problem exists not only with respect to oxidative after treatment processes for the carbon black but in general for the principal chemical reactions of carbon blacks.

In principal, the mentioned considerations which are noted in connection with the oxidation processes also apply for the desorption procedures as well as the decomposition methods. Thus in those processes, the treated carbon blacks came together with the treatment gases in a concurrent stream which was loaded with the highest content of the desorbed components whereby the risk of a reabsorption may arise. However, at the other end the fresh carbon black which easily splits off the desorbable components unintentionally came into contact with fresh treating gases.

Through the use of the countercurrent stream principal, there may be obtained a considerably increased effectiveness or an equal effectiveness at shorter dwell times by using equal gas quantities. However also here again, a desired ability to regulate the level is a prerequisite.

As a means for creating a signal indicating the level of the fluidized bed, there are apparatus on the market which, for example, register a suppression of the electrical oscillation of stimulated metal forks or the changing of the dielectrical properties with the immersion of the designed sensor in the fluidized bed. In the reduced density of a carbon black fluidized bed even at lower temperatures the first designated apparatus type is frequently unreliable, while at high temperature it is totally useless because of the material from which it is made.

Those apparatus which relate to the dielectric measurement are unusable because of the electrical conductivity of the carbon black and the inevitable deposition on the insulators of the electrodes.

The present invention therefore has as its object to provide for a suitable method for the treatment of fluidized carbon black with gases, especially at higher temperatures, in a fluidized bed which utilizes the countercurrent stream principle, and further, provides an apparatus for the carrying out of this method with instrumentation which utilizes a signal control for the regulation of the level in the fluidized bed.

The process according to the invention is characterized in that the carbon black and the treating gases are introduced in accordance with the desired operational conditions in a sense of obtaining an uniform reaction velocity and uniform temperature distribution in the treating zone in a countercurrent manner, the material streams of the carbon black and the treating gases are held constant and the material stream of the initial carbon black introduced into the system or that of the treated carbon black is so controlled with the assistance of an optical electrical level sensor that the height of the fluidized bed can be held at a predetermined level.

For the process of the present invention there is used as the aforementioned optical electrical level sensor a device which operates on the principle of light absorption through the fluidized carbon and the creation of an electrical signal.

The new method of the present invention results in two operational advantages. The first is that it is now possible to obtain the treated carbon black in a material stream that is constant with time and the initial starting material carbon black is introduced in such an amount that the level of the fluidized bed can be held constant.

The second point of commercial advantage arises because the starting material carbon black can be introduced in a timewise constant mass stream and the treated carbon black can be recovered in such an amount that the level of the fluidized bed can be held constant.

From these two operational points, the first has the advantage of a more economic reaction in the event of a disturbance in the system; namely, in the event of a reduction in the withdrawal of the carbon black product, an excess filling of the treating vessel can be avoided with assurance and thereby preclude the possibility of a potential safety hazard.

Hence, in its broadest aspect, the present invention pertains to a method for treatment of carbon black in a fluidized reaction bed by subjecting a downwardly flowing material stream of carbon black to an upwardly moving gaseous stream. The gas may be one or more gases including oxidative gases such as oxygen, steam, carbon dioxide, mixtures of nitrogen oxide and air and the like. The gases may also be selected to strip absorbed organics from the surfaces of the descending carbon black. Still further, the gases may be selected to achieve at least partial decomposition of the carbon black. The countercurrent flow so described is regulated to insure uniform conditions of material flow and temperature in the fluidizing zone. Generally, elevated temperatures are selected depending on the gases, size of equipment, flow rates and the like which will be readily determinable by those skilled in this art.

A further feature of the present invention resides in an apparatus for the carrying out of the method of the present invention. The apparatus is composed of a vertically oriented, cylindrically shaped holding vessel which is fitted at the lower end of its fluidizing portion with a jacket or chamber which is cylindrical in cross-section and conically shaped in the downward direction, the jacket having inside thereof as a displacement member, an upwardly oriented conic shaped displacement body, which apparatus further has at the lowest or deepest part of the fluidizing portion in the conically shaped downward depending section, the charging port of an injection pipe for the treating gases, said pipe being essentially in tangential orientation, a quieting zone chamber located above the treating fluidizing chamber and fitted with an exhaust pipe for the exhaust gas and which apparatus is characterized by the fact that there is a product pipe for discharging carbon black vertically positioned in the axial portion of said upwardly oriented conic displacement body, the upper end of the pipe having a mouth which opens in the attenuated upper end of the conic section, said product pipe being connected to a valve, and at the head of the quieting chamber there is located a pipe for charging the initial carbon black starting material and this pipe is connected to another valve, the upper end of the fluidized bed vessel between the treating zone and the quieting zone above the two valves being fitted with the optical electrical level sensor. The sensor is connected to the upper valve which controls the valve for charging the carbon black starting material. As an alternative, the sensor may be connected to the exit valve at the bottom of the vessel to control product outflow from the system.

A further feature of the present invention is a level sensor means which operates to advantage in the apparatus provided by the present invention and which is very suitable for use therein but which has universal application for the indication of a predetermined level, especially in hot fluidized beds containing light absorbing particles. The invention provides a technical embodiment for the carrying out of countercurrent procedures in the described art. The new level sensor means is characterized by a generally hair pin shaped light circuit or light conveying rods which is interrupted by a gap or space and which is provided on one leg thereof with a light source and on the other leg thereof is provided with a light sensor which creates an electrical signal and which are connected together whereby the level sensor instrumentation relative to the fluidized bed is so arranged that the gap is positioned in the appropriate portion of the fluidized bed so as to create signals depending on the presence of the fluidized bed in the gap which effects the signals that are sent out from the light source to the light sensor.

The level sensing device includes a circuit formed of an optical pathway generally in the form of a hair pin or U-shaped glass rod having two elongated legs, there being a gap or space formed in one of its two leg sections. The gap or space therefore divides the optical pathway into one relatively short and straight leg and one relatively long leg which includes the bend or U-shape. The optical pathway is so oriented that the longer of the two legs has focused at its exterior end a suitable light source. The shorter of the two legs is oriented so as to focus the light which it conveys onto a light sensing device at its exterior end. The two exterior ends of the hair pin shaped pathway are each sealed in a secure manner into a light proof chamber adjacent each other.

In order to avoid an eventual deposition of the solid material on the light circuit ends in the gap and to periodically remove any unwanted deposits on them, there is envisioned according to an advantageous embodiment of the invention, a further modification of the level sensor means whereby the device is fitted with a flushing gas jet which is oriented to send an impulse or blast of gas to at least one of the light circuit ends of the gap.

In order to be resistant towards deposition, there is further developed an advantageous embodiment wherein smooth or polished construction of the light circuit ends is provided on the gap. This can be achieved by such measures as finely grinding, polishing or smooth melting.

A particularly useful variation of the level sensor means according to the invention arises in the construction whereby the light conveying light circuit leg is attenuated for light bundling in the gap and/or the light exiting surface in the gap is constructed in a convex shape. In this way, the light stream which exits in the gap is more strongly concentrated and the light loss is reduced.

As the material for forming the light circuit or pathway, there may be used rods of temperature resistant and corrosion resistant glasses such as, for example, quartz glass or glasses used in the chemical industry. These substances are known in the art.

For the light source, there may be used lamps which emit a light which will activate light sensitive elements such as photocells, phototransistors or photoresistance. Advantageously, there may be used in front of the light sensitive elements a filter which only permits light of predetermined wave lengths to pass through. Such devices are known in the art.

The rearward extending ends of the legs of the hair pin shaped lighting circuit pass out of the fluidized bed in their returning portion and end in a chamber of the measuring device which is oriented and arranged outside the fluidized bed treating vessel and the light source and the light sensor are each fitted in one of the chambers. The two chambers are light proof relative to each other. In the chamber for the light sensor, there may be arranged additional equipment for signal amplification or modification.

The light circuit legs as well as the flushing gas line extend out of the measuring head device in a gas tight manner and are also surrounded by protective pipe which at the same time is fitted to the treating vessel is a gas tight manner and interconnected thereto.

A particularly advantageous embodiment of the apparatus of the present invention with the built in level sensor means is shown in the drawings.

Thus,

Figure 1:
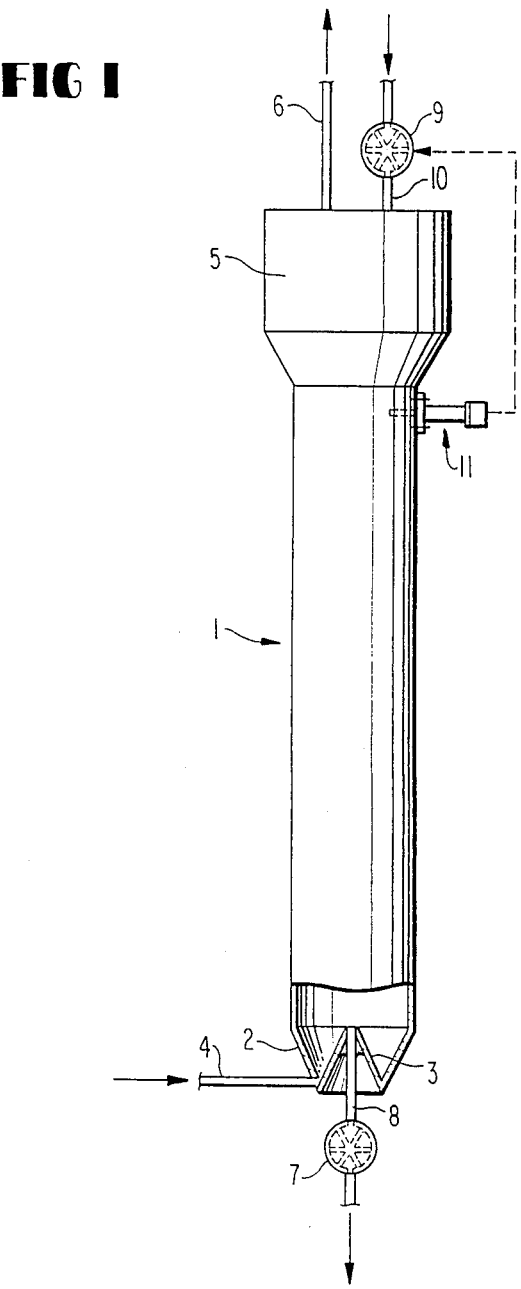
FIG. 1 is a schematic representation of the fluidized bed apparatus of the present invention.

Described in further detail, the fluidized bed apparatus as shown in FIG. 1 is formed of a vertically oriented cylindrically shaped treatment vessel 1. This vessel has affixed to its lower end a fluidization section which is formed of a conically shaped jacket or chamber 2 which is cylindrical in cross-section and is conically shaped in a downwardly oriented direction, a displacement body 3 which is set into the conical end 2 of the fluidization vessel 1, and which body 3 is oriented in an upwardly oriented direction, a charging pipe 4 for the introduction of the treating gases which is positioned in essentially tangential orientation at least at the lowest portion of the fluidization portion 2. Above the treating vessel 1, there is located a quieting zone 5 which has an exhaust pipe 6 for the exhaust gases. The quieting zone portion 5 advantageously possesses a somewhat larger cross-section than does the treating vessel 1 in order to reduce the velocity of the stream of the carrier gases below the settling velocity of the fluidized carbon black.

In order that this apparatus can be operated in a countercurrent stream it is provided with the following features: In the displacement body 3, there is axially placed a carbon black product removal pipe 8 provided with a valve 7. The port or mouth of the pipe 8 is located in the attenuated end of the displacement body 3. At the head of the calming down zone 5, there is attached a carbon black introduction line or pipe 10 which is fitted with a dosing valve 9. The valve 9 is charged with carbon black from a bunker or holding tank (not shown) which is connected therewith. In the event of a loading or charging from a charging tank containing carbon black which is located lower than the top of vessel 1, the carbon black material is charged through a pneumatic conveying arrangement into valve 9 and into a pretreatment apparatus for precipitation, for example, a cyclone (not shown) which is connected with the carbon black entry pipe 10 from which the carrying stream is separated and the carbon black is introduced into the head of the apparatus 5.

In order to hold the level of the fluidized bed at a constant level, an optical electrical sensor 11 which converts the optical density of the mass of material into an electrical voltage is positioned at a location between the treatment vessel 1 and the settling down portion 5.

This level determining means which is attached to the sensor 11 controls the dosing or carbon black charging valve 9.

Figure 2:
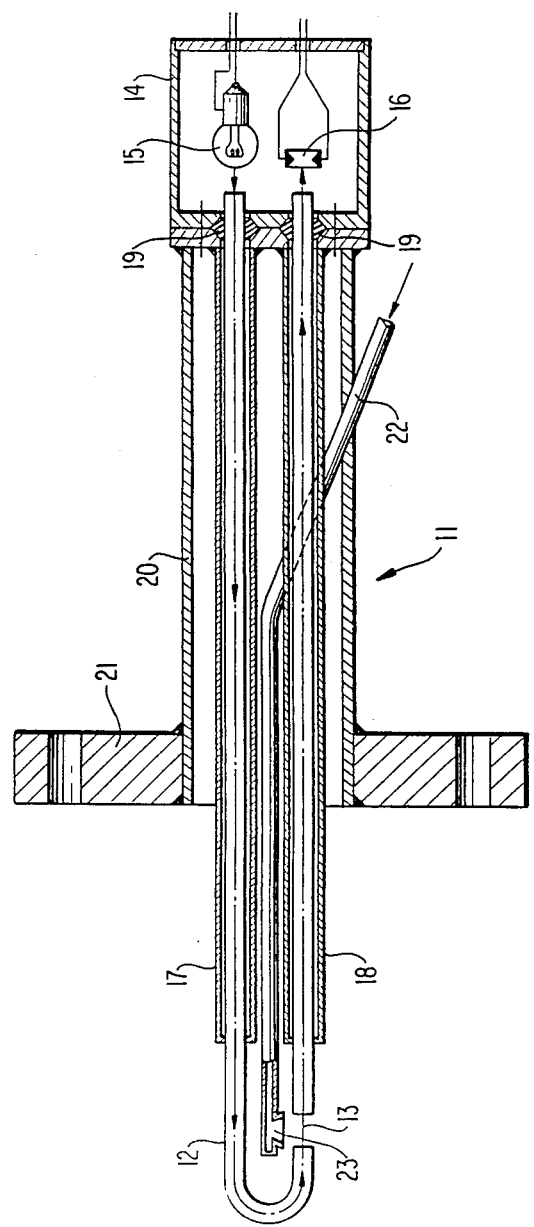
FIG. 2 is a detailed cross-sectional view of an advantageous embodiment of the level sensor means which is shown in schematic representation with respect to the connection to the fluidized bed apparatus in FIG. 1.

Principally, there are in accordance with the apparatus of the present invention various embodiments of the level sensor means which are suitable and which operate in accordance with the principles described. A particularly advantageous and operationally reliable form of the level sensor means which is described as a feature of the present invention is shown in FIG. 2 and is in the form of a hair pin shaped lighting circuit or rods 12 which has in one of its legs, a gap or space 13 which serves as the measuring zone. Both of the legs of the interrupted lighting circuit end in a measuring head body 14 which is divided into two light proof chambers. One of the chambers contains a lighting source 15 which serves to illuminate one of the legs of the lighting circuit 12; i.e. the longer of the two legs. In the other chamber, there is located a light sensor 16 which is oriented and aligned with the second, or shorter, leg of the lighting circuit. For the light sensor, there may be used a variety of means such as a photoresistance, phototransistors or photocells. It is to be particularly noted that a very advantageous means for carrying out the invention is a measuring strengthening device for the strengthening of the light dependent electrical signals of the light sensor in the measuring chamber 14.

The two legs of the light circuit 12 are arranged in a guiding pipes 17 and 18. Through packing means 19, the light circuit legs are arranged and located in the guiding pipe in a gas proof sealed condition. The light circuit 12 and the guiding pipes 17 and 18 are surrounded by a protective tube 20 which is provided with a flange 21 or a similar arrangement, by means of which the level sensor may be positioned in the vessel wall in a gas tight manner and is secured therein and thereby enables the gap 13 to be arranged in the interior of the treatment vessel 1, the measuring head 14, however, is thereby located outside of the treatment vessel. In order to avoid the deposition of dust on the light circuit ends in the gap, the surface areas of the light circuit ends are previously polished or smooth melted in their manufacture to present a very flush surface arrangement.

In addition, for the avoidance of deposits of dust in the gap 13, the level sensor means can have a cleaning line 22 which has on its end a exit opening 23 which is oriented to the position over and above the gap 13 and thereby is able to periodically flush the surfaces of the gap with an pulse or jet of a suitable gas to flush away any deposits.

The method for the treatment of carbon black in countercurrent flow with gases in a fluidized bed can in this manner be carried out so that one can obtain the treated carbon black from the fluidized bed in a timewise constant mass stream and the introduced carbon black can be injected or charged in such amounts that the level of the fluidized bed can be held constant.

The apparatus as illustrated in FIG. 1 is noteable by the fact that the valve 7 which is connected to the exiting pipe 8 can be operated with constant rotation. In the event that the surface of the fluidized bed sinks below the level which is predetermined by the level sensor means 11, then the level sensor means operates to open the charging valve 9 for such a period of time until the gap of the level sensor means is again in contact with the fluidized bed by the increase of the height thereof. In this manner there is injected through the changing valve 9, by the timewise constant removal of product from the valve 7, sufficient carbon black that the fluidized bed continues to maintain the predetermined level through operation of the level sensor means 11.

According to a second variation of the process, the initial carbon black charged to the system can also, by means of valve 9, be introduced in a timewise constant mass stream into the fluidized bed. In this event, the carbon black product which is obtained through discharge from valve 7 can be so controlled through the level sensor means 11 that the valve 7 can be set into operation when the level sensor means 11 is contacted by and immersed in the fluidized bed and can be held thereat and can be slowly controlled when the level of the fluidized bed sinks below the level of the predetermined height of the fluidized bed.

In regard to the operational safety in the event of a disturbance in the system and the continuity of the reaction taking place, the first described variation of the method is preferred.

Further variations and modifications of the present invention will become apparent to those skilled in the art from a reading of the foregoing which are intended to be encompassed by the claims appended hereto.

We claim:

1. Apparatus for the treatment of carbon black with gases in a fluidized bed, comprising a vertically oriented, cylindrically shaped fluidized bed treating vessel having an upper end and a lower end, a downwardly directed, conically shaped wall of cylindrical cross section having an upper end connected to the lower end of the cylindrical vessel and terminating in a lower end which is connected to a lower end of a centrally disposed, conically shaped upwardly directed displacement body, said conically shaped displacement body defining an opening consisting of a centrally disposed carbon black discharge line extending therethrough and having an inlet end at an apex of said displacement body, valve means connected to said centrally disposed discharge line, at least one gas injection means tangentially connected to said downwardly directed conically shaped wall at its lower end, quieting chamber means connected to the upper end of the cylindrical vessel and having a cross sectional area greater than that of the cylindrical vessel, said quieting chamber means having exiting means for the exhaust gas, carbon black feed means connected to said quieting chamber and having valve means therein to control the feeding of carbon black to the cylindrical vessel and optical sensing means located in the vessel adjacent the upper end thereof to determine the upper level of a fluidized bed maintained therein.

* * * * *